Dec. 29, 1964 H. G. BLANK 3,163,766

COMPLEMENTING CIRCUIT EMPLOYING ELECTROLUMINESCENT AND PHOTOCONDUCTIVE ELEMENTS

Filed May 29, 1961

INVENTOR.
HANS G. BLANK
BY R. J. Frank
ATTORNEY

United States Patent Office 3,163,766
Patented Dec. 29, 1964

3,163,766
COMPLEMENTING CIRCUIT EMPLOYING ELECTROLUMINESCENT AND PHOTOCONDUCTIVE ELEMENTS

Hans G. Blank, New York, N.Y., assignor to General Telephone and Electronics Laboratories, Inc., a corporation of Delaware Filed May 29, 1961, Ser. No. 113,544
7 Claims. (Cl. 250—213)

Figure 1:
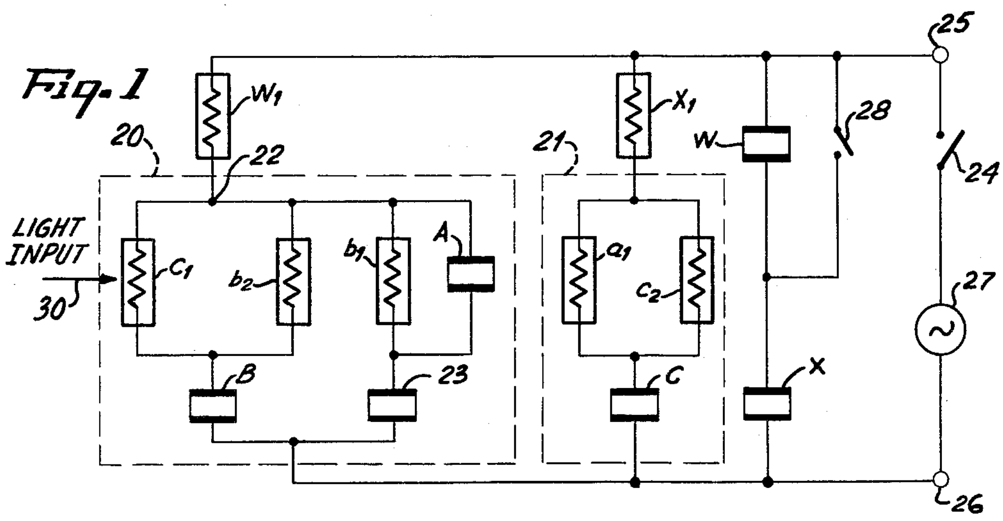

This invention relates to computer circuits employing electroluminescent and photoconductive elements and, in particular, to circuits for complementing binary input signals.

In digital computers, a common method used to subtract a first binary number from a second binary number is to add the complement of the first number to the second. The complement of a binary number is obtained by changing each 1 in the number to a 0 and each 0 in the number to a 1. For example, if it is desired to subtract the binary number 1001 (nine in a radix ten system) from 1100 (twelve in the radix ten system) the complement of 1001 or 0110 is added to 1100. The result, after adding the carry occurring in the highest order of 1100 to the units column, is the difference 0011 (three in the radix ten system).

I have invented an improved circuit employing electroluminescent and photoconductive elements which can be used to complement a binary signal. The operation of this circuit is precise and is independent of the duration of the complementing signal so long as the duration of this signal exceeds a predetermined minimum value.

In accordance with my invention, a complementing circuit is produced which comprises a pair of terminals adapted for connection to a suitable voltage source, a main storage unit, and a temporary storage unit. The main storage unit includes first and second light emitting elements, first photoconductive means electrically connected in parallel with the first light emitting element, and second photoconductive means electrically connected in series with the second light emitting element. The first photoconductive means is optically coupled to the second light emitting element.

The temporary storage unit includes a third light emitting element electrically connected in series with a third photoconductive means. The third light emitting element is optically coupled to the second photocondutive means and the third photoconductive means is optically coupled to the first light emitting element. Switching means is provided for alternately connecting the main and temporary storage units across the pair of energized terminals.

In one form of the invention, each of the light emitting elements comprises an electroluminescent phosphor layer or cell which emits light in the presence of an electric field. Each of the photoconductive means (hereinafter termed photoconductors) is composed of a material, such as activated cadmium sulfide, which exhibits a high impedance to current flow in the dark and a much lower impedance when illuminated. In this embodiment, the main storage unit includes first and second electroluminescent cells, the first photoconductive means comprises a first photoconductor, and the second photoconductive means includes second and third photoconductors. The first electroluminescent cell and the first, second and third photoconductors each have one end connected to a common junction. The other ends of the first electroluminescent cell and first photoconductor are connected to one end of an impedance element while the second electroluminescent cell is connected between the other ends of the second and third photoconductors and the other end of the impedance element.

The temporary storage circuit includes a third electroluminescent cell connected in series with the third photoconductive means, the third photoconductive means including fourth and fifth parallel-connected photoconductors. The first electroluminescent cell is optically coupled to the fourth photoconductor, the second electroluminescent cell is optically coupled to the first and second photoconductors, and the third electroluminescent cell is optically coupled to the third and fifth photoconductors. The switching means consists of sixth and seventh photoconductors connected in series with the main and temporary storage units respectively, the sixth and seventh photoconductors being illuminated by alternately activated electroluminescent light sources.

In a typical computer, one complementing circuit is generally required for each binary digit in the number to be complemented. Binary 1's are introduced into each of the complementing circuits by the application of input light impulses to the main storage unit; 0's are indicated by the absence of input pulses.

Except when the complementing operation is actually being performed, the main storage unit is connected across the voltage source and the temporary storage unit is effectively disconnected from the source. In the absence of an input light pulse, the first light emitting element or electroluminescent cell is energized signifying storage of a 0. Application of an input light pulse to the second or third photoconductors deenergizes the first electroluminescent cell and energizes the second electroluminescent cell signifying storage of a 1.

The binary number contained in the main storage unit is complemented by momentarily connecting the temporary storage unit across the voltage source and simultaneously disconnecting the main storage unit from the source. If a 0 has been stored in the main storage unit (corresponding to lighting of the first electroluminescent cell), the third electroluminescent cell is energized through the low impedance of the illuminated fourth photoconductor. The decay time of the fourth photoconductor is long enough to energize the third electroluminescent cell which then maintains itself in an energized state through the fifth photoconductor. Light from the third electroluminescent cell falls on the third photoconductor, and therefore when the main storage unit is connected to the voltage source, the second electroluminescent cell is energized. Light emitted by the second electroluminescent cell impinges upon the first photoconductor reducing its impedance and effectively short-circuiting the first electroluminescent cell. Thus, the 0 signified by the lighting of the first electroluminescent cell is changed to its 1's complement as indicated by the lighting of the second electroluminescent cell and the extinguishing of the first electroluminescent cell.

On the other hand, if a 1 had been initially stored in the main storage unit by energizing the second electroluminescent cell, the third electroluminescent cell would not have been illuminated when the temporary storage unit was connected to the voltage source. As a result, when the voltage is reapplied across the main storage unit, the first electroluminescent cell is illuminated. Thus, the 1 initially stored in the main storage unit is changed to its complement, a 0.

Figure 2:
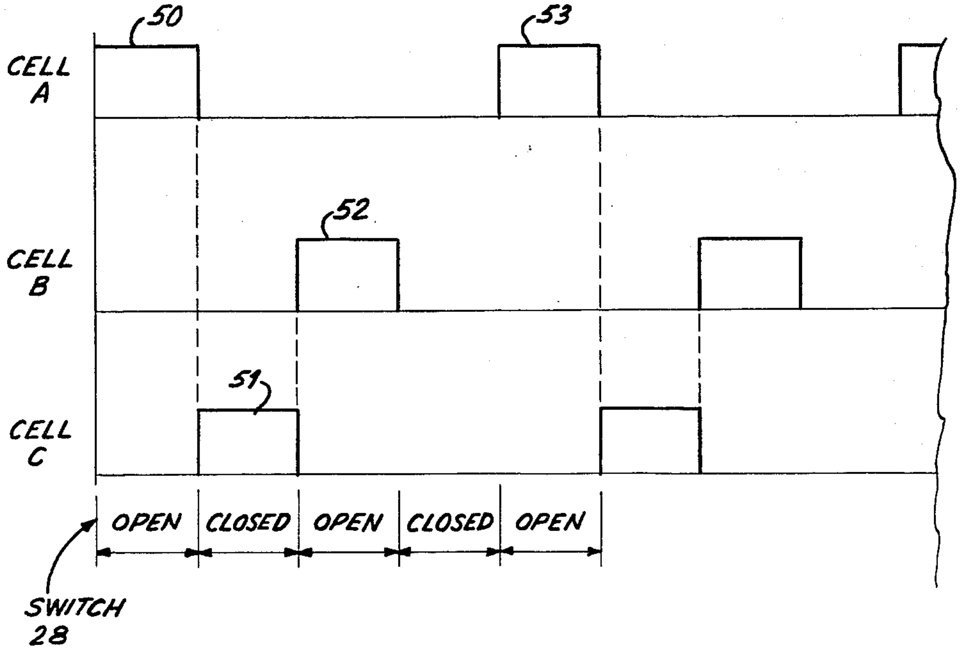

The above introduction to the present invention will be more fully understood and further advantages will become apparent from a study of the following description in connection with the drawings, wherein:

FIG. 1 is a schematic diagram of a complementing circuit embodying my invention; and FIG. 2 is a graph showing the sequence of operation of the electroluminescent cells.

As shown in FIG. 1, the complementing circuit includes a main storage unit 20 and a temporary storage unit 21. Each of the electroluminescent cells in the storage units, as well as in the remainder of the circuit is designated by a capital letter. The photoconductor or photoconductors which are optically coupled to a particular electroluminescent cell are designated by a corresponding lower case letter. Although FIG. 1 shows only one complementing circuit, it shall be understood that a similar circuit is provided for each binary digit.

The main storage unit 20 consists of first and second electroluminescent cells A and B and first, second and third photoconductors $b_1$, $b_2$, and $c_1$. One end of electroluminescent cell A and one end of each of the photoconductors $b_1$, $b_2$ and $c_1$ are connected to a common junction point 22. Electroluminescent cell A and photoconductor $b_1$ are connected in parallel with each other and in series with an impedance element 23, element 23 having an impedance equal to about one-tenth that of electroluminescent cell A. Element 23 is preferably an electroluminescent cell, but may also be a capacitor or other impedance device. Since impedance elemnt 23 need not be an electroluminescent cell and is not optically coupled to any of the photoconductors, it has been designated by a numeral, rather than by a capital letter. Electroluminescent cell B is connected to the other ends of parallel-connected photoconductors $b_2$ and $c_1$.

The temporary storage unit 21 consists of an electroluminescent cell C connected in series with fourth and fifth parallel-connected photoconductors $a_1$ and $c_2$. As indicated by the component designations, electroluminescent cell A is optically coupled to photoconductor $a_1$, electroluminescent cell B is optically coupled to photoconductors $b_1$ and $b_2$, and electroluminescent cell C is optically coupled to photoconductors $c_1$ and $c_2$.

The main storage unit 20 is connected through a switching photoconductor $w_1$ to a terminal 25 while the temporary storage unit 21 is connected to terminal 25 through a switching photoconductor $x_1$. Electroluminescent cells B, C and 23 are connected to a terminal 26. An alternating voltage source 27 is coupled between terminals 25 and 26 through a switch 24.

A pair of electroluminescent cells W and X are connected in series across terminals 25 and 26, the impedance of cell X being about one-tenth that of cell W. Electroluminescent cell W is optically coupled to photoconductor $w_1$, and electroluminescent cell X is optically coupled to photoconductor $x_1$. A complementing switch 28 is arranged to short electroluminescent cell W and apply the entire voltage from source 27 across electroluminescent cell X.

The operation of the circuit can best be understood by first assuming that no input light signal is applied to the circuit, that switch 24 is closed, and that switch 28 is open. Under these conditions, most of the voltage applied by source 27 appears across electroluminescent cell W due to its relatively high impedance and only a small percentage is applied across electroluminescent cell X. As a result, electroluminescent cell W emits light and electroluminescent cell X is dark. Light from electroluminescent cell W illuminates photoconductor $w_1$ thereby energizing electroluminescent cell A through the relatively low impedance of element 23. Thus, cell A emits light and cell B is dark indicating that a 0 has been stored in the complementing circuit. In addition, light emitted by electroluminescent cell A falls upon photoconductor $a_1$, sharply reducing the impedance of photoconductor $a_1$.

In order to perform the complementing function (i.e. extinguish electroluminescent cell A and light electroluminescent cell B thereby changing the 0 to a 1), complementing switch 28 is closed. This connects the entire voltage of source 27 across electroluminescent cell X and deenergizes cell W. Light from electroluminescent cell X illuminates photoconductor $x_1$ thereby energizing electroluminescent cell C through the low impedance of photoconductors $x_1$ and $a_1$. Since the impedance of photoconductor $a_1$ increases relatively slowly after electroluminescent cell A has been deenergized, the voltage impressed across electroluminescent cell C is sufficient to energize it. Once electroluminescent cell C is energized, the light it emits illuminates photoconductor $c_2$ lowering its impedance. Consequently, cell C is maintained in an energized state through the low impedances of photoconductors $x_1$ and $c_2$.

Light from electroluminescent cell C also illuminates photoconductor $c_1$. Thus, when switch 28 is opened resulting in the energizing of electroluminescent cell W and the reduction in impedance of photoconductor $w_1$, electroluminescent cell B is energized through photoconductors $w_1$ and $c_1$. As the case of photoconductor $a_1$, the decay time of photoconductor $c_1$ is sufficient to permit electroluminescent cell B to be energized. Light from electroluminescent cell B then falls on photoconductor $b_2$, decreasing its impedance and providing a low impedance path for the continued excitation of cell B. Consequently, the information stored in electroluminescent cell A is transferred to electroluminescent cell C by the closing of complementing switch 28 and then transferred to electroluminescent cell B upon the opening of switch 28. Since the lighting of cell A signified storage of a 0 and the subsequent lighting of cell B indicates storage of a 1, the desired complementing operation has been obtained. The time required to perform the complementing operation is typically between 15 and 20 milliseconds with a minimum time between closures of the complementing switch of 15 milliseconds.

If the digit to be initially stored in the complementing circuit is a 1, an input light signal designated by the arrow 30 is applied to storage unit 20. This input light may be directed upon photoconductor $c_1$ (as shown), photoconductor $b_2$, or upon a photoconductor especially provided for this purpose and connected in parallel with photoconductors $b_2$ and $c_1$. In the circuit of FIG. 1, electroluminescent cell B is energized through the low impedance of photoconductors $w_1$ and $c_1$, illuminates photoconductor $b_2$, and is maintained in an energized state through the low impedance of photoconductor $b_2$ even after the input signal has been removed. Electroluminescent cell A does not light because it is shorted by the low impedance of photoconductor $b_1$. The lighting of electroluminescent cell B and the darkening of cell A signifies that a 1 has been stored in the circuit.

Closing complementing switch 28 deenergizes electroluminescent cell W, darkens photoconductor $w_1$ increasing its impedance, and causes electroluminescent cell B to be deenergized. Opening switch 28 again energizes electroluminescent cell W, illuminates photoconductor $w_1$ reducing its impedance, and energizes electroluminescent cell A. Thus, the 1 stored in the circuit by the lighting of electroluminescent cell B is transferred to a 0 by the lighting of electroluminescent cell A. Electroluminescent cell B is not energized when switch 28 is opened because the impedance of darkened photoconductors $b_2$ and $c_1$ have both reached relatively high values.

Switch 24 is provided to permit the removal of a stored digit from the main storage unit 20. When the switch is reclosed, electroluminescent cell A (corresponding to a binary 0) is energized in the absence of an input signal while electroluminescent cell B (corresponding to a binary 1) is energized if an input signal has been applied. It shall be noted that either electroluminescent cell A or electroluminescent cell B can be illuminated at one time; they are never illuminated simultaneously.

FIG. 2 is a graph showing the sequence of operation of the complementing circuit. The interval during which electroluminescent cell A is illuminated and switch 28 is open is shown at 50. The duration of this interval may be as long as desired and is not indicated by the graph which shows only the sequence of operation. When switch 28 is closed, electroluminescent cell A is extinguished and electroluminescent cell C is illuminated as shown at 51. Opening the switch extinguishes electroluminescent cell C and energizes cell B as shown at 52. When switch 28 is closed again, all of the cells remain off until the switch is opened illuminating cell A as shown at 53.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A complementing circuit comprising a pair of terminals; a main storage unit including first and second light emitting elements, first photoconductive means electrically connected in parallel with said first light emitting element and optically coupled to said second light emitting element, second photoconductive means electrically connected in series with said second light emitting element, and impedance means electrically connected in series with said first light emitting element, said series-connected means and said first light emitting element being coupled in parallel with said series-connected second light emitting element and second photoconductive means; a temporary storage unit including a third light emitting element, said third light emitting element being optically coupled to the second photoconductive means of said main storage unit, and third photoconductive means electrically connected in series with said third light emitting element and optically coupled to said first light emitting element; and switching means for alternately connecting said main and temporary storage units across said pair of terminals.

2. A complementing circuit comprising a pair of terminals; a main storage unit including first and second light emitting elements, first photoconductive means electrically connected in parallel with said first light emitting element and optically coupled to said second light emitting element, second photoconductive means electrically connected in series with said second light emitting element, and impedance means electrically connected in series with said first light emitting element, said series-connected impedance means and said first light emitting element being coupled in parallel with said series-connected second light emitting element and second photoconductive means, a temporary storage unit including a third light emitting element, said third light emitting element being optically coupled to the second photoconductive means of said main storage unit, and third photoconductive means electrically connected in series with said third light emitting element and optically coupled to said first light emitting element; and switching means for alternately connecting said main and temporary storage units across said pair of terminals, said switching means including a pair of switching photoconductors, one of said pair of switching photoconductors being connected in series with said main storage unit and the other of said pair of switching photoconductors being connected in series with said temporary storage unit, said pair of switching photoconductors being alternately illuminated from an applied light source.

3. A complementing circuit comprising a pair of terminals; a main storage unit including first and second light emitting elements, first photoconductive means electrically connected in parallel with said first light emitting element and optically coupled to said second light emitting element, second photoconductive means electrically connected in series with said second light emitting element, and impedance means electrically connected in series with said first light emitting element, said series-connected impedance means and said first light emitting element being coupled in parallel with said series-connected second light emitting element and second photoconductive means; a temporary storage unit including a third light emitting element, said third light emitting element being optically coupled to the second photoconductive means of said main storage unit, and third photoconductive means electrically connected in series with said said third light emitting element and optically coupled to said first light emitting element; switching means for alternately connecting said main and temporary storage units across said pair of terminals, said switching means including a pair of switching photoconductors, one of said pair of switching photoconductors being connected in series with said main storage unit and the other of said pair of switching photoconductors being connected in series with said temporary storage unit, said switching means further including a pair of light emitting elements electrically connected across said pair of terminals, one of said pair of light emitting elements being optically coupled to one of said switching photoconductors and the other of said light emitting elements being optically coupled to the other of said switching photoconductors.

4. A complementing circuit comprising a pair of terminals; a main storage unit including a first electroluminescent cell and first, second, and third photoconductors, said first electroluminescent cell and each of said first, second, and third photoconductors having one end electrically connected to a common junction, impedance means having one end electrically connected to the other ends of said first electroluminescent cell and said first photoconductor, and a second electroluminescent cell electrically connected between the other ends of said second and third photoconductors and the other end of said impedance means; a temporary storage unit including a third electroluminescent cell and fourth and fifth photoconductors, said fourth and fifth photoconductors being electrically connected in parallel and said third electroluminescent cell being electrically coupled to one junction of said fourth and fifth parallel-connected photoconductors, said first electroluminescent cell being optically coupled to said fourth photoconductor, said second electroluminescent cell being optically coupled to said first and second photoconductors, and said third electroluminescent cell being optically coupled to said third and fifth photoconductors; and switching means for alternately connecting said main and temporary storage units across said pair of terminals.

5. A complementing circuit comprising a pair of terminals; a main storage unit including a first electroluminescent cell and first, second, and third photoconductors, said first electroluminescent cell and each of said first, second, and third photoconductors having one end electrically connected to a common junction, impedance means having one end electrically connected to the other ends of said first electroluminescent cell and said first photoconductor, and a second electroluminescent cell electrically connected between the other ends of said second and third photoconductors and the other end of said impedance means; a temporary storage unit including a third electroluminescent cell and fourth and fifth photoconductors, said fourth and fifth photoconductors being electrically connected in parallel and said third electroluminescent cell being electrically coupled to one junction of said fourth and fifth photoconductors, said first electroluminescent cell being optically coupled to said fourth photoconductor, said second electroluminescent cell being optically coupled to said first and second photoconductors, and said third electroluminescent cell being optically coupled to said third and fifth photoconductors; and switching means for alternately connecting said main and temporary storage units across said pair of terminals, said switching means including a sixth photoconductor connected between said main storage unit and said terminals and a seventh photoconductor connected between said temporary storage unit and said terminals, said sixth and seventh photoconductors being alternately illuminated from an applied light source.

6. A complementing circuit comprising a pair of terminals adapted for coupling to a voltage source, a main storage unit including a first electroluminescent cell and first, second, and third photoconductors, said first electroluminescent cell and each of said first, second, and third photoconductors having one end electrically connected to a common junction, impedance means having one end electrically connected to the other ends of said first electroluminescent cell and said first photoconductor, and a second electroluminescent cell electrically connected between the other ends of said second and third photoconductors and the other end of said impedance means; a temporary storage unit including a third electroluminescent cell and fourth and fifth photoconductors, said fourth and fifth photoconductors being electrically connected in parallel and said third electroluminescent cell being electrically coupled to one junction of said fourth and fifth photoconductors, said first electroluminescent cell being optically coupled to said fourth photoconductor, said second electroluminescent cell being optically coupled to said first and second photoconductors, and said third electroluminescent cell being optically coupled to said third and fifth photoconductors; switching means including sixth and seventh photoconductors electrically connecting said main and temporary storage units respectively across said pair of terminals; and fourth and fifth electroluminescent cells optically coupled to said sixth and seventh photoconductors respectively, said fourth and fifth electroluminescent cells being alternately energized from said voltage source, said first or second electroluminescent cells being energized when said sixth photoconductor is illuminated by said fourth electroluminescent cell and said third electroluminescent cell being energized when said seventh photoconductor is illuminated by said fifth electroluminescent cell.

7. A complementing circuit comprising a pair of terminals adapted for coupling to a voltage source, a main storage unit including a first electroluminescent cell and first, second, and third photoconductors, said first electroluminescent cell and each of said first, second and third photoconductors having one end electrically connected to a common junction, impedance means having one end electrically connected to the other ends of said first electroluminescent cell and said first photoconductor, said impedance means having an impedance substantially less than that of said first electroluminescent cell, and a second electroluminescent cell electrically connected between the other ends of said second and third photoconductors and the other end of said impedance means; a temporary storage unit including a third electroluminescent cell and fourth and fifth photoconductors, said fourth and fifth photoconductors being electrically connected in parallel, and said third electroluminescent cell being electrically coupled to one junction of said fourth and fifth photoconductors, said first electroluminescent cell being optically coupled to said fourth photoconductor, said second electroluminescent cell being optically coupled to said first and second photoconductors, and said third electroluminescent cell being optically coupled to said third and fifth photoconductors; first switching means including a sixth photoconductor for connecting said main storage unit across said pair of terminals, second switching means including a seventh photoconductor for connecting said temporary storage unit across said terminals; fourth and fifth electroluminescent cells electrically connected in series across said pair of terminals and optically coupled to said sixth and seventh photoconductors respectively; said fifth electroluminescent cell having an impedance substantially less than that of said fourth electroluminescent cell; and a complementing switch electrically connected in parallel with said fourth electroluminescent cell, said main storage unit being energized only when said complementing switch is open and said temporary storage unit being energized only when said complementing switch is closed.

References Cited by the Examiner

UNITED STATES PATENTS

| | | | |
|---|---|---|---|
| 2,895,054 | 7/59 | Loebner | 250—213 |
| 2,907,001 | 9/59 | Loebner | 250—213 |
| 3,011,157 | 11/61 | Anderson | 250—213 |
| 3,042,807 | 7/62 | Vize | 250—213 |
| 3,087,068 | 4/63 | Bowerman | 250—213 |

RALPH G. NILSON, *Primary Examiner.*

DARYL W. COOK, *Examiner.*